United States Patent
Hansen et al.

(10) Patent No.: US 8,614,281 B2
(45) Date of Patent: *Dec. 24, 2013

(54) MOISTURE-CURABLE SILOXANES AND SILOXANE POLYMERS

(75) Inventors: Richard G. Hansen, Mahtomedi, MN (US); David S. Hays, Woodbury, MN (US); Suresh Iyer, Woodbury, MN (US); John W Frank, Cottage Grove, MN (US); Ramesh C. Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/518,542

(22) PCT Filed: Dec. 20, 2010

(86) PCT No.: PCT/US2010/061274
§ 371 (c)(1),
(2), (4) Date: Jun. 22, 2012

(87) PCT Pub. No.: WO2011/090644
PCT Pub. Date: Jul. 28, 2011

(65) Prior Publication Data
US 2013/0011673 A1 Jan. 10, 2013

Related U.S. Application Data

(60) Provisional application No. 61/290,921, filed on Dec. 30, 2009.

(51) Int. Cl.
*C08F 283/12* (2006.01)
*C08G 77/452* (2006.01)

(52) U.S. Cl.
USPC ...................................................... 525/474

(58) Field of Classification Search
USPC ...................................................... 525/474
See application file for complete search history.

(56) References Cited

U.S. PATENT DOCUMENTS

| | | | |
|---|---|---|---|
| 2,676,182 A | 4/1954 | Daudt | |
| 3,627,851 A | 12/1971 | Brady | |
| 3,772,247 A | 11/1973 | Flannigan | |
| 4,085,137 A * | 4/1978 | Mitsch et al. | 428/835.8 |
| 4,119,615 A * | 10/1978 | Schulze | 528/343 |
| 4,707,531 A | 11/1987 | Shirahata | |
| 4,774,310 A | 9/1988 | Butler | |
| 4,935,484 A | 6/1990 | Wolfgruber | |
| 5,091,483 A | 2/1992 | Mazurek | |
| 5,110,890 A | 5/1992 | Butler | |
| 5,214,119 A | 5/1993 | Leir | |
| 5,248,739 A | 9/1993 | Schmidt | |
| 5,262,558 A | 11/1993 | Kobayashi | |
| 5,302,671 A | 4/1994 | Cifuentes | |
| 5,302,685 A | 4/1994 | Tsumura | |
| 5,319,040 A | 6/1994 | Wengrovius | |
| 5,659,001 A | 8/1997 | de la Croi Habimana | |
| 5,981,680 A | 11/1999 | Petroff | |
| 6,355,759 B1 * | 3/2002 | Sherman et al. | 528/28 |
| 6,407,195 B2 | 6/2002 | Sherman | |
| 6,441,118 B2 * | 8/2002 | Sherman et al. | 528/28 |
| 7,316,843 B2 | 1/2008 | Mooney | |
| 7,371,464 B2 * | 5/2008 | Sherman et al. | 428/447 |
| 7,501,184 B2 | 3/2009 | Leir | |
| 2007/0149745 A1 | 6/2007 | Leir | |
| 2008/0318057 A1 | 12/2008 | Sherman | |
| 2008/0318065 A1 | 12/2008 | Sherman | |
| 2011/0092638 A1 * | 4/2011 | Leir et al. | 524/588 |
| 2012/0259088 A1 * | 10/2012 | Iyer et al. | 528/343 |
| 2012/0271025 A1 * | 10/2012 | Hays et al. | 528/26 |
| 2013/0012667 A1 * | 1/2013 | Hansen et al. | 525/477 |

FOREIGN PATENT DOCUMENTS

JP 2-36234 2/1990

OTHER PUBLICATIONS

Encyclopedia of Polymer Science and Engineering, vol. 15, John Wiley & Sons, New York, (1989), pp. 265 to 270.
International Search Report for PCT International Application No. PCT/US2010/061274 Mailed on Sep. 30, 2011, 4 pages.

* cited by examiner

*Primary Examiner* — Mike M Dollinger
(74) *Attorney, Agent, or Firm* — Jeffrey M. Olofson

(57) ABSTRACT

Siloxane-containing reactive compounds contain moisture-curable alkoxy-silane functional end groups. The siloxane-containing reactive compounds may be prepared from siloxane-containing oxamide compounds or amine compounds. Siloxane-containing polymers may be prepared from the reactive compounds by reaction with water. The siloxane-containing polymers may be release materials or adhesives.

20 Claims, No Drawings

MOISTURE-CURABLE SILOXANES AND SILOXANE POLYMERS

CROSS REFERENCE TO RELATED APPLICATIONS

This application is a national stage filing under 35 U.S.C. 371 of PCT/US2010/061274, filed Dec. 20, 2010, which claims priority to U.S. Provisional Application No. 61/290,921, filed Dec. 30, 2009, the disclosure of which is incorporated by reference in its/their entirety herein.

FIELD OF THE DISCLOSURE

The present disclosure relates generally to reactive siloxane compounds, specifically moisture-curable siloxane compounds and polymers prepared from reactive siloxane compounds.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides and polydiorganosiloxane polyureas are exemplary block copolymers.

Polydiorganosiloxane polyamides have been prepared by condensation reactions of amino terminated silicones with short-chained dicarboxylic acids. Alternatively, these copolymers have been prepared by condensation reactions of carboxy terminated silicones with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than about 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Polydiorganosiloxane polyureas are another type of block copolymer. Although these block copolymers have many desirable characteristics, some of them tend to degrade when subjected to elevated temperatures such as 250° C. or higher.

SUMMARY

Reactive compounds containing moisture-curable groups and methods of preparing the reactive compounds are presented. Additionally, polymers prepared from the moisture-curable reactive compounds and articles containing these polymers are also disclosed.

Reactive compounds described by the formula:

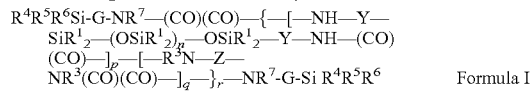

Formula I are disclosed, wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is an alkylene or aralkylene group with from 1-10 carbon atoms; Z is an alkylene, aralkylene or heteroalkylene group; each $R^3$ is hydrogen or alkyl or $R^3$ taken together with Z and with the nitrogen to which they are both attached forms a heterocyclic group; $R^4$, $R^5$, and $R^6$, are each independently an alkyl, aryl or alkoxy group with the proviso that at least one of $R^4$, $R^5$, and $R^6$ is an alkoxy group; each $R^7$ is independently a hydrogen, alkyl, aryl group or heteroalkyl group; n is independently an integer of 0 to 1500; p is an integer of 1 or greater; q is an integer of 0 or greater; and r is an integer of 1 or greater.

Methods of preparing reactive compounds are disclosed, comprising mixing together under reaction conditions a compound of the formula:

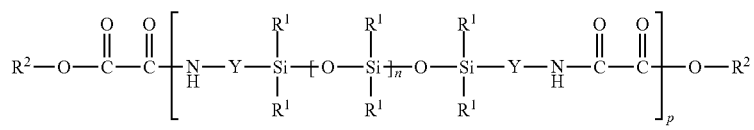

Formula II wherein each $R^1$ is independently an alkyl, haloalkyl, aralkyl, alkenyl, aryl, or aryl substituted with an alkyl, alkoxy, or halo; each $R^2$ is independently an alkyl, haloalkyl, aryl, or aryl substituted with an alkyl, alkoxy, halo, alkoxycarbonyl, or imino of formula $-N=CR^8R^9$ where $R^8$ is hydrogen, alkyl, aralkyl, substituted aralkyl, aryl, or substituted aryl, and $R^9$ is alkyl, aralkyl, substituted aralkyl, aryl, or substituted aryl; each Y is independently an alkylene, aralkylene, or a combination thereof; n is independently an integer of 0 to 1500; and p is an integer of 1 or greater; and an amine of formula $R^7HN-G-SiR^4R^5R^6$, wherein G is an alkylene or aralkylene group with from 1-10 carbon atoms; and $R^7$ is hydrogen or alkyl or $R^7$ taken together with G and with the nitrogen to which they are both attached forms a heterocyclic group: and $R^4$, $R^5$, and $R^6$, are each independently an alkyl, aryl or alkoxy group with the proviso that at least one of $R^4$, $R^5$, and $R^6$ is an alkoxy group.

Also disclosed are polymers that comprise the reaction product of a reaction mixture comprising a reactive compound with the formula:

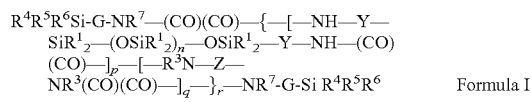

Formula I wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is an alkylene or aralkylene group with from 1-10 carbon atoms; Z is an alkylene, aralkylene or heteroalkylene group; each $R^3$ is hydrogen or alkyl or $R^3$ taken together with Z and with the nitrogen to which they are both attached forms a heterocyclic group; $R^4$, $R^5$, and $R^6$, are each independently an alkyl, aryl or alkoxy group with the proviso that at least one of $R^4$, $R^5$, and $R^6$ is an alkoxy group; each $R^7$ is independently a hydrogen, alkyl, aryl group or heteroalkyl group; n is independently an integer of 0 to 1500; p is an integer of 1 or greater; q is an integer of 0 or greater; and r is an integer of 1 or greater; and water. In some embodiments, the reaction mixture may also comprise a moisture cure catalyst and/or a crosslinking agent. The polymers may have a variety of properties, in some instances the polymers may comprise release materials or may, upon the addition of a tackifying resin comprise adhesives.

A wide variety of articles are also disclosed. Included are articles comprising a substrate; and a polymer layer on the substrate, wherein the polymer comprises the reaction product of a reaction mixture comprising a reactive compound with the formula:

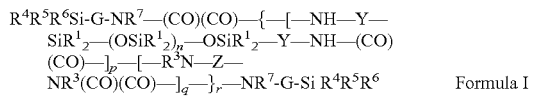

$R^4R^5R^6Si\text{-}G\text{-}NR^7\text{--}(CO)(CO)\text{--}\{\text{--}[\text{--}NH\text{--}Y\text{--}SiR^1{}_2\text{--}(OSiR^1{}_2)_n\text{--}OSiR^1{}_2\text{--}Y\text{--}NH\text{--}(CO)(CO)\text{--}]_p\text{--}[\text{--}R^3N\text{--}Z\text{--}NR^3(CO)(CO)\text{--}]_q\text{--}\}_r\text{--}NR^7\text{-}G\text{-}Si\ R^4R^5R^6$  Formula I wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is an alkylene or aralkylene group with from 1-10 carbon atoms; Z is an alkylene, aralkylene or heteroalkylene group; each $R^3$ is hydrogen or alkyl or $R^3$ taken together with Z and with the nitrogen to which they are both attached forms a heterocyclic group; $R^4$, $R^5$, and $R^6$, are each independently an alkyl, aryl or alkoxy group with the proviso that at least one of $R^4$, $R^5$, and $R^6$ is an alkoxy group; each $R^7$ is independently a hydrogen, alkyl, aryl group or heteroalkyl group; n is independently an integer of 0 to 1500; p is an integer of 1 or greater; q is an integer of 0 or greater; and r is an integer of 1 or greater; and water.

DETAILED DESCRIPTION

Moisture-curable siloxane compounds and methods of preparing moisture-curable siloxane compounds are presented. The moisture-curable siloxane compounds may be readily prepared from a wide array of precursor molecules. The moisture-curable siloxane compounds can be used to prepare a wide variety of siloxane polymers. The siloxane polymers may be crosslinked or uncrosslinked, and may be elastomeric or release polymers. The elastomeric polymers can be used to prepare pressure sensitive adhesives by the addition of silicone tackifying resins. The polymers prepared from the moisture-curable siloxane compounds of this disclosure have many of the desirable features of polysiloxanes such as low glass transition temperatures, thermal and oxidative stability, resistance to ultraviolet radiation, low surface energy and hydrophobicity, and high permeability to many gases. Additionally, because the polymers are prepared from moisture-curable siloxane compounds prepared from siloxane polyoxamides, the formed polymers can have improved mechanical strength and thermal stability due to these groups. In some embodiments, the polymers have desirable optical properties such as being optically clear or having a low refractive index or even a combination of these properties.

The terms "a", "an", and "the" are used interchangeably with "at least one" to mean one or more of the elements being described.

The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive become tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term "oxamido ester" refers to a group of formula $R^aO—(CO)—(CO)—NR^b—$ where each (CO) denotes a carbonyl, $R^a$ is an alkyl, haloalkyl, aryl, or aryl substituted with an alkyl, alkoxy, halo, or alkoxycarbonyl, or imino of formula —N=$CR^8R^9$ where $R^8$ is hydrogen, alkyl, aralkyl, substituted aralkyl, aryl, or substituted aryl, and $R^9$ is alkyl, aralkyl, substituted aralkyl, aryl, or substituted aryl, and $R^b$ is hydrogen or an alkyl group.

The term "imino" refers to a group of formula —N=$CR^8R^9$ where the $R^8$ group is hydrogen, alkyl, aralkyl, substituted aralkyl, aryl, or substituted aryl and the $R^9$ group is alkyl, aralkyl, substituted aralkyl, aryl, or substituted aryl.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "polydiorganosiloxane" refers to a divalent segment of formula

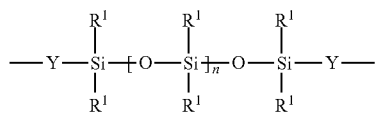

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

The terms "room temperature" and "ambient temperature" are used interchangeably to mean temperatures in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The moisture-curable siloxane compounds of this disclosure are useful synthons for the preparation of wide range of siloxane materials. The moisture-curable siloxane compounds may be described as oxamido siloxanes with terminal moisture-curable groups. Because of the moisture-reactivity of these compounds, in some embodiments it may be desirable to generate the moisture curable siloxane compounds in a reaction mixture and permit them to moisture cure to produce polymers rather than isolate the moisture-curable siloxane compounds and use them as polymer synthons.

The general structure of these moisture-curable siloxane compounds is described by Formula I below, which is a segmented compound in which the segments described by the subscripts p and q may be arranged in any sequence:

$R^4R^5R^6Si$-G-$NR^7$—(CO)(CO)—{—[—NH—Y—$SiR^1_2$—$(OSiR^1_2)_n$—$OSiR^1_2$—Y—NH—(CO)(CO)—]$_p$—[—$R^3$N—Z—$NR^3$(CO)(CO)—]$_q$—}$_r$—$NR^7$-G-Si $R^4R^5R^6$     Formula I wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is an alkylene, aralkylene or heteroalkylene group with from 1-10 carbon atoms; Z is an alkylene, aralkylene or heteroalkylene group; each $R^3$ is a hydrogen, alkyl, or aryl group or the $R^3$ groups taken together with Z and with the nitrogens to which they are attached forms a heterocyclic group; $R^4$, $R^5$, and $R^6$, are each independently an alkyl, aryl or alkoxy group with the proviso that at least one of $R^4$, $R^5$, and $R^6$ is an alkoxy group; each $R^7$ is independently a hydrogen, alkyl, aryl group or heteroalkyl group; n is independently an integer of 0 to 1500; p is an integer of 1 or greater; q is an integer of 0 or greater; and r is an integer of 1 or greater.

Each $R^1$ is independently an alkyl, haloalkyl, aralkyl, alkenyl, aryl, or aryl substituted with an alkyl, alkoxy, or halo. Generally, at least 50% of the $R^1$ groups are methyl groups. Typically if some of the $R^1$ groups are not methyl groups they are phenyl groups or substituted aryl groups. In some embodiments, it is desirable to replace a portion of methyl groups in the siloxane backbone to effect a change in properties of the siloxane, especially the optical properties. Replacement of a substantial number of methyl groups with, for example, phenyl groups can raise the refractive index of polymers formed from these moisture-curable siloxanes. Due to the greater commercial availability of and relatively lower cost of siloxane starting materials in which all $R^1$ groups are methyl groups, many embodiments contain methyl groups for all, or essentially all $R^1$ groups.

Each Y is independently an alkylene, aralkylene, or a combination thereof. Generally, the Y groups are the same and are alkylene groups with from 1 to 10 carbon atoms. More typically, the Y groups are alkylene groups with 1-3 carbon atoms. Since the moisture-curable siloxanes are generally prepared from siloxane diamines in which the Y groups are propylene groups (—$CH_2CH_2CH_2$—), the Y groups in many embodiments are these groups.

Each $R^7$ is independently a hydrogen, an alkyl group with from 1 to 10 carbon atoms, an aryl group with from 1 to 10 carbon atoms, or a heteroalkyl group. When $R^7$ is a heteroalkyl group it can contain nitrogen or oxygen atoms.

Each $R^3$ is independently a hydrogen, an alkyl group with from 1 to 10 carbon atoms, an aryl group with from 1 to 10 carbon atoms, or the $R^3$ groups taken together with Z and with the nitrogens to which they are attached forms a heterocyclic group. Typically $R^3$ is a hydrogen or an alkyl group with from 1-3 carbon atoms.

The group G is the residue of an amine molecule that is used to prepare the moisture-curable siloxane. G is generally an alkylene, aralkylene or heteroalkylene group with from 1-10 carbon atoms, more typically 1-5 carbon atoms. When G is a heteroalkylene group, the hetero atom may be oxygen or nitrogen. In one particular embodiment, the G group comprises a —$(CH_2)_2$—NH—$(CH_2)_3$— group. The group G links the N atom to the moisture-curable alkoxy silane group —$SiR^4R^5R^6$. The groups $R^4$, $R^5$, and $R^6$, are each independently an alkyl, aryl or alkoxy group with the proviso that at least one of $R^4$, $R^5$, and $R^6$ is an alkoxy group. Alkoxy silanes are subject to reaction with water to form silanol groups as shown in Reaction Scheme A. These silanol groups further condense to form —Si—O—Si— bonds. As can be seen from the reactions of Reaction Scheme A (wherein R and $R^c$ represent alkyl, aralkyl or aryl groups) the overall transformation is catalytic in water (as much water is produced as is consumed) and generates an equivalent of an alcohol.

Reaction Scheme A

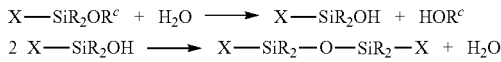

A wide variety of moisture-curable alkoxy silane groups —$SiR^4R^5R^6$ are possible. Generally there are two classes of moisture-curable alkoxy silane groups that are commercially, and therefore readily, available. In one class, two of the $R^4$, $R^5$, and $R^6$ groups are alkoxy groups and the other group is typically an alkyl or aryl group. In the other readily available class, the $R^4$, $R^5$, and $R^6$ groups are the same and therefore all are alkoxy groups. Typically, in embodiments of this disclosure, the $R^4$, $R^5$, and $R^6$ groups, whether they are alkyl or alkoxy groups, contain 1-10 carbon atoms, or 1-5 carbon atoms or even 1-3 carbon atoms. Examples of suitable moisture-curable alkoxy silane groups —$SiR^4R^5R^6$ include, —Si$(OMe)_3$, —Si$(OEt)_3$, —Si$(OPr)_3$, —Si$(OMe)_2$Me, —Si$(OEt)_2$Me, —Si$(OMe)_2$Et, —Si$(OEt)_2$Et, —Si$(OPr)_2$Me, and the like, where Me=methyl, Et=ethyl and Pr=propyl.

The subscript n is an integer of 0 to 1500. The value of n reflects the molecular weight of the siloxane portion of the moisture-curable siloxane compound. A wide range of n values are possible and available. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20. The molecular weight of the siloxane portion of the moisture-curable siloxane compound greatly affects the final properties of polymers prepared from the moisture-curable siloxane compounds.

The subscript p is an integer of 1 or greater. In some embodiments, the value of p is in the range of 1 to 10. For example, the value of p is often an integer up to 9, up to 8, up to 7, up to 6, up to 5, up to 4, up to 3, or up to 2. In some embodiments, value of p can be in the range of 1 to 8, 1 to 6, or 1 to 4. In some embodiments the value of p is greater than 10.

The subscript q is an integer of 0 or greater. If the value of q is 0, the unit subtended by this value is not present in the compound. If the value of q is 1 or greater, the unit subtended by q is present. In some embodiments, the value of q is 1 to 10. The group subtended by subscript q is an optional group in the moisture curing compound resulting from the chain extension reaction utilizing a diamine molecule ($HR^3N$—Z—$NHR^3$) with a siloxane oxamide. Chain extension of siloxane oxamides by reaction with diamines will be explained further below. The Z unit is an alkylene, aralkylene or heteroalkylene group. When Z is an alkylene or an aralkylene it typically has from 1-10 carbon atoms, more typically 1-6 carbon atoms. Examples of alkylene and aralkalene groups include methylene, ethylene, propylene, butylene, pentylene, benzylene and the like. When Z is a heteroalkylene group it is usually an oxyalkylene group. The Z group may also be a heterocyclic group incorporating the $R^3$ groups and the nitrogen atoms to which they are attached. An example of an amine that could generate a such a Z group is piperazine.

The subscript r is an integer of 1 or greater In some embodiments, the value of r is in the range of 1 to 10. Typically the subscript r is an integer of 1 to 5, 1 to 3, or even 1 to 2. In other embodiments, the value of r may be larger than 10.

While Formula I shows a single structure, it should be understood that samples of moisture-curable siloxane compounds of this disclosure may contain more than one compound of Formula I, i.e. the moisture-curable siloxanes may be a mixture. Generally, mixtures of moisture-curable siloxane compounds result from precursor compounds that are mixtures, from reactions containing mixtures of amines, or both.

The moisture-curable siloxane compounds of Formula I can be prepared from a variety of starting materials, and the selection of these starting materials greatly impacts the properties of the moisture-curable siloxane compounds and of polymers made from them. The moisture-curable siloxane compounds are prepared from the reaction of an oxamido ester terminated siloxane with an amine containing a moisture-curable group. The general structure for the oxamido ester terminated siloxane is described by Formula Ia below, which is a segmented compound in which the segments described by the subscripts p and q may be arranged in any sequence:

$R^2O$—(CO)(CO)—{—[—NH—Y—$SiR^1_2$—
$(OSiR^1_2)_n$—$OSiR^1_2$—Y—NH—
(CO)(CO)—]$_p$—[—$R^3N$—Z—
$NR^3$(CO)(CO)—]$_q$—}$_r$—$OR^2$     Formula Ia wherein $R^1$, $R^3$, Y, Z, n, q, r, and p are as previously defined and each group $R^2$ is independently an alkyl, haloalkyl, aryl, or aryl substituted with an alkyl, alkoxy, halo, alkoxycarbonyl, or imino of formula —N=$CR^8R^9$ where $R^8$ is hydrogen, alkyl, aralkyl, substituted aralkyl, aryl, or substituted aryl, and $R^9$ is alkyl, aralkyl, substituted aralkyl, aryl, or substituted aryl. Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl). Suitable imino groups of formula —N=CR$^8$R$^9$ are ones where R$^8$ and R$^9$ are alkyl groups that are linear or branched and typically contain 1 to 10 carbon atoms, 1 to 8 carbon atoms, 1 to 6 carbon atoms, or 1 to 4 carbon atoms or aryl, substituted aryl, aralkyl, and substituted aralkyl groups with from 6 to 12 carbon atoms. Especially suitable groups R$^2$ include alkyls having 1 to 4 carbon atoms, haloalkyls having 1 to 4 carbon atoms, phenyl, and imino.

A variety of different synthetic routes may be used to prepare the oxamido ester terminated siloxane of Formula Ia. In some instances the oxamido ester terminated siloxane of Formula Ia is isolated prior to reaction with an amine containing a moisture-curable group, while in other instances, the oxamido ester terminated siloxane of Formula Ia is generated from a reaction mixture and the amine containing a moisture-curable group is added to the reaction mixture in a single pot.

One useful synthetic route involves the use of a an oxamido ester terminated siloxane described by Formula II below:

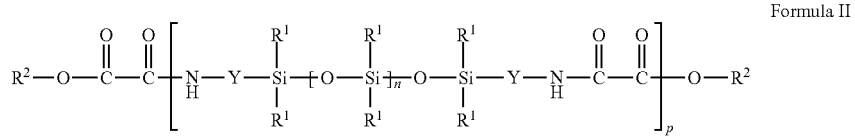

Formula II wherein R$^1$, R$^2$, Y, n and p are as previously defined. The structure of Formula II corresponds to the structure of Formula Ia in which the subscript q is zero and therefore the unit subtended by q is not present.

The oxamide of Formula II can include a single compound (i.e., all the compounds have the same value of p and n) or can include a plurality of compounds (i.e., the compounds have different values for p, different values for n, or different values for both p and n). Oxamides with different n values have siloxane chains of different length. Oxamides having a p value of at least 2 are chain extended.

In some embodiments, the oxamide is a mixture of a first compound of Formula II with subscript p equal to 1 and a second compound of Formula II with subscript p equal to at least 2. The first compound can include a plurality of different compounds with different values of n. The second compound can include a plurality of compounds with different values of p, different values of n, or different values of both p and n. Mixtures can include at least 50 weight percent of the first compound of Formula II (i.e., p is equal to 1) and no greater than 50 weight percent of the second compound of Formula II (i.e., p is equal to at least 2) based on the sum of the weight of the first and second compounds in the mixture. In some mixtures, the first compound is present in an amount of at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, or at least 98 weight percent based on the total amount of the compounds of Formula II. The mixtures often contain no greater than 50 weight percent, no greater than 45 weight percent, no greater than 40 weight percent, no greater than 35 weight percent, no greater than 30 weight percent, no greater than 25 weight percent, no greater than 20 weight percent, no greater than 15 weight percent, no greater than 10 weight percent, no greater than 5 weight percent, or no greater than 2 weight percent of the second compound.

Different amounts of the chain-extended oxamide of Formula II in the mixture can affect the properties of the compounds of Formula I and of polymers prepared from the compounds of Formula I. That is, the amount of the second compound of Formula II (i.e., p equal to at least 2) can be varied advantageously to provide elastomeric materials with a range of properties. For example, a higher amount of the second compound of Formula II can alter the melt rheology (e.g., the elastomeric material can flow easier when present as a melt), alter the softness of the elastomeric material, lower the modulus of the elastomeric material, or a combination thereof.

The polydiorganosiloxane-containing oxamide of Formula II can be prepared by any known method. In some embodiments, this oxamide is prepared according to Reaction Scheme B.

Reaction Scheme B

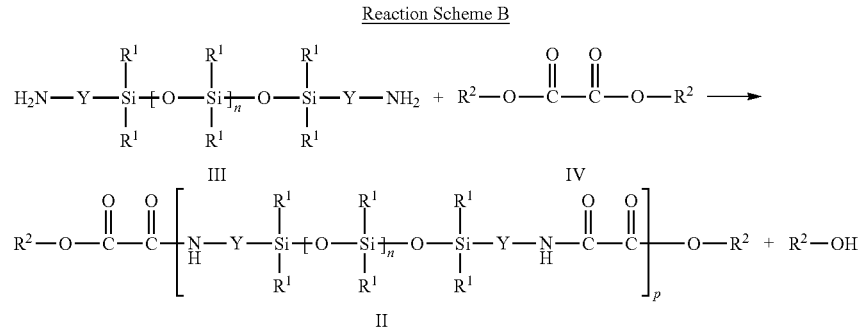

A polydiorganosiloxane diamine of Formula III is reacted with a molar excess of an oxalate of Formula IV under an inert atmosphere to produce the polydiorganosiloxane-containing oxamide of Formula II and $R^2$—OH by-product. In this reaction, $R^1$, $R^2$, Y, n, and p are the same as previously described for Formula I. The preparation of the oxamide of Formula II according to Reaction Scheme B is further described in US Patent Publication No. 2007/0149745 (Leir et al.) and U.S. Pat. No. 7,501,184 (Leir et al.).

The oxamido ester terminated siloxanes of Formula II may be reacted with 2 equivalents of amine containing a moisture-curable group to generate the moisture-curable siloxane compounds of Formula I and 2 equivalents of the alcohol $R^2OH$. Additionally, diamine chain extension agents of the type $HR^3N$—Z—$NHR^3$ where $R^3$ and Z are as previously defined, may also be included in the reaction mixture to incorporate the units —$R^3N$—Z—$NR^3$— into the compound of Formula I. Unlike the amines containing a moisture-curable group which are mono-functional and therefore chain capping, the diamine chain extension agents are difunctional and therefore extended the chain rather than capping it. Similarly, chain extension could also be carried out at the time that the oxamide ester terminated siloxane of Formula II is formed, in which it would have the structure of Formula Ia. Whether a chain extension agent or chain extension agents are used and the amounts of such agents used is determined by the properties desired for the moisture curable siloxane compounds formed as well as for the properties of polymers formed from these compounds. For example, when incorporation of short chain alkylene diamine chain extension agents with 1-5 carbon atoms into moisture curable siloxane compounds, can increase the stiffness of polymers formed from such compounds relative to polymers formed from moisture curable siloxane compounds that do not incorporate the chain extension agents.

There are additional pathways and reactions suitable for preparing the oxamide ester terminated siloxane of Formula Ia that do not start with the compound of Formula II. For example, the oxamide ester terminated siloxane of Formula Ia can be prepared from reaction mixtures containing a polydiorganosiloxane diamine of Formula III, at least one diamine of the formula $HR^3N$—Z—$NR^3H$, where Z and $R^3$ are as previously defined, and a molar excess of an oxalate of Formula IV under an inert atmosphere. A variety of different reaction sequences can be used to effect the synthesis of the oxalate-capped compound, for example the diamines can be added to a molar excess of oxalate, oxalate can be added to a mixture of diamines, or the diamine of formula $HR^3N$—Z—$NR^3H$ can be added to a mixture of oxalate and polydiorganosiloxane diamine. The resulting oxalate-capped compound can then be reacted with an amine containing a moisture-curable group is described by Formula V as is described below.

Similar alternative synthetic pathways can also be used which are similar to Reaction Scheme B, except that instead of an oxalate of Formula IV, an oxalate-capped diamine of the general formula $R^2$—O—(CO)(CO)—$R^3N$—Z—$NR^3$—(CO)(CO)—O—$R^2$, where $R^2$, $R^3$ and Z are as previously defined and (CO) describes a carbonyl group C=O, is used. The oxalate-capped diamine of the general formula $R^2$—O—(CO)(CO)—$R^3N$—Z—$NR^3$—(CO)(CO)—O—$R^2$, can be prepared from the reaction of a diamine of formula $HR^3N$—Z—$NR^3H$ with a molar excess of an oxalate of Formula IV. The reaction of a molar excess of an oxalate-capped diamine of the general formula $R^2$—O—(CO)(CO)—$R^3N$—Z—$NR^3$—(CO)(CO)—O—$R^2$, with a polydiorganosiloxane diamine produces an oxamide ester terminated siloxane of Formula Ia. This oxalate-capped compound can then be reacted with an amine containing a moisture-curable group is described by Formula V as is described below.

The general structure of amines containing a moisture-curable group is described by Formula V below:

$$HR^7N\text{-}G\text{-}SiR^4R^5R^6 \qquad \text{Formula V}$$

wherein the groups $R^4$, $R^5$, $R^6$, $R^7$ and G are as previously defined. In some embodiments, $R^7$ is hydrogen, or an alkyl or aryl group with 1-6 carbon atoms; G is an alkylene group with 1-10 carbon atoms, 1-5 carbon atoms or 1-3 carbon atoms or a heteroalkylene with 1-10 carbon atoms and a nitrogen heteroatom; and the moisture-curable alkoxy silane groups —$SiR^3R^4R^5$ include, —$Si(OMe)_3$, —$Si(OEt)_3$, —$Si(OPr)_3$, —$Si(OMe)_2Me$, —$Si(OEt)_2Me$, —$Si(OMe)_2Et$, —$Si(OEt)_2Et$, —$Si(OPr)_2Me$, and the like, where Me=methyl, Et=ethyl and Pr=propyl. Examples of suitable amines containing a moisture-curable group include members of the SILQUEST family of compounds commercially available from Momentive Performance Materials, Albany N.Y., such as, for example: $H_2N(CH_2)_3Si(OEt)_3$ commercially available as SILQUEST A-1100; $H_2N(CH_2)_3Si(OMe)_3$ commercially available as SILQUEST A-1110; $H(Et)NCH_2CH(Me)CH_2Si(OMe)_3$ commercially available as SILQUEST A-LINK 15; $H_2N(CH_2)_2NH(CH_2)_3Si(OMe)_2Me$ commercially available as SILQUEST A-2120; and $H(Ph)N(CH_2)_3Si(OMe)_3$ (where Ph=phenyl) commercially available as SILQUEST Y-9669.

The condensation reaction of the oxamide of Formula II with the 2 equivalents of amine containing a moisture-curable group typically is conducted at room temperature, but the reaction may be conducted at elevated temperatures such as at temperatures up to about 250° C. More typically, the reaction may be conducted at room temperature or at temperatures up to about 100° C. In some embodiments, a combination of reaction temperatures are used, for example, the reaction temperature may be elevated for a period and room temperature for a period. The condensation reaction is often complete in less than 1 hour, in less than 2 hours, in less than 4 hours, in less than 8 hours, or in less than 12 hours.

The reaction to form the moisture-curable siloxane of Formula I can occur in the presence or absence of a solvent. Suitable solvents usually do not react with any of the reactants or products of the reactions. Additionally, suitable solvents are usually capable of maintaining all the reactants and all of the products in solution throughout the polymerization process. Exemplary solvents include, but are not limited to, toluene, tetrahydrofuran, dichloromethane, aliphatic hydrocarbons (e.g., alkanes such as hexane), esters (such as ethyl acetate) or mixtures thereof.

Any solvent that is present can be stripped from the resulting moisture-curable siloxane at the completion of the reaction. Solvents that can be removed under the same conditions used to remove the alcohol by-product are often preferred. The stripping process is often conducted at a temperature of at least 100° C., at least 125° C., or at least 150° C. The stripping process is typically at a temperature less than 300° C., less than 250° C., or less than 225° C.

Conducting the reaction to form the compound of Formula I in the absence of a solvent can be desirable because only the volatile by-product, $R^2OH$, needs to be removed at the conclusion of the reaction.

Any suitable reactor or process can be used to prepare the compound of Formula I. The reaction can be conducted using a batch process, semi-batch process, or a continuous process. Typically the compound of Formula I is prepared in a batch process. The batch process can be conducted in virtually any reaction vessel equipped with agitation device capable of stirring fluids. The reaction vessels may be glass, glass lined metal or metal, typically the vessels are glass. Suitable agitation devices include mechanical stirrers, magnetic stirrers, shaker tables, rotation racks, rollers, Brabender mixers and the like. Examples of suitable reaction vessels included stirred flasks, shaken flasks or bottles, rotated flasks or bottles, and the like. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

As mentioned previously, due to the moisture-reactivity of the moisture-curable siloxane compounds, in some embodiments it may be desirable to prepare the moisture-curable siloxane in a reaction mixture and proceed to curing the moisture-curable siloxane without isolating the siloxane compound.

Alternatively, the moisture-curable compound of Formula I can be prepared by a different pathway, in which the reagent containing the siloxane segment is amine-functional and the reagent containing the moisture-curable segment is oxamide-functional.

The amine-functional siloxane can be a siloxane diamine such as is described by Formula III or an oxamido ester terminated siloxane which is amine-capped. The amine-capped oxamide is generally represented by Formula VI below:

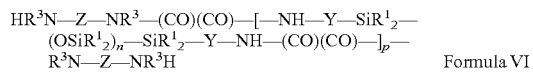

$HR^3N-Z-NR^3-(CO)(CO)-[-NH-Y-SiR^1{}_2-(OSiR^1{}_2)_n-SiR^1{}_2-Y-NH-(CO)(CO)-]_p-$
$R^3N-Z-NR^3H$   Formula VI wherein the groups $R^1$, Y, n, p, $R^7$ and Z are as previously defined. The compound of Formula VI can be prepared by reacting the oxamide of Formula II with greater than 2 equivalents of a diamine of the type $HR^3N-Z-NHR^3$ which was previously described as a chain extension agent. However when the diamine is present in greater than a stoichiometric excess and reaction conditions are maintained where the diamine is always present in excess, the diamine can act as a chain termination agent instead of a chain extension agent. One technique for effecting this reaction is to add the oxamide of Formula II to a rapidly stirred solution or neat mixture of greater than a stoichiometric excess of diamine. Typically, low molecular weight diamines are used which permit easy removal of the excess diamine upon completion of the reaction. In some embodiments, the diamine contains a Z group which is a short chain alkyl group such as ethylene, propylene or butylene and each $R^3$ is a hydrogen.

The amine-capped oxamide of Formula VI can be reacted with an oxamide-functional compound containing a moisture-curable group. The oxamide-functional compound containing a moisture-curable group can be generally represented by Formula VII below:

$R^2-O-(CO)-(CO)-R^7N-G-SiR^4R^5R^6$   Formula VII wherein the groups $R^2$, $R^4$, $R^5$, $R^6$, $R^7$ and G are as previously defined and —(CO)— represents a carbonyl group C=O. such a compound may be prepared by reacting a compound of Formula V with an oxalate of Formula IV.

The reaction of an amine-functional siloxane of Formula VI with oxamide-functional compound with a moisture-curable group of Formula VII gives a moisture-curable siloxane of Formula I.

The moisture-curable siloxane compounds described by Formula I may be used to provide polymeric materials. Typically the moisture-curable terminal groups of the siloxane compounds are used to incorporate the compounds into polymers. A variety of different polymers may be prepared with the moisture-curable siloxane compounds of this disclosure. Typically the polymers formed are elastomeric in nature, even if crosslinked. The moisture-curable siloxane compounds may be allowed to self-condense (i.e. the moisture-curable siloxane compound is the only moisture-reactive compound present), or additional moisture-curable or silanol-reactive groups may be present.

The moisture curing reaction of the moisture-curable siloxane compounds was shown in Reaction Scheme A, above. In this scheme, the terminal moisture-curable groups react with water to generate Si—OH groups. These Si—OH groups condense with other Si—OH groups to generate Si—O—Si linkages. Because the reaction produces as much water as is consumed, only very small quantities of water are needed to produce this curing. Often ambient humidity (that is to say the amount of moisture present in the air) is sufficient to effect this curing reaction. In some embodiments it may be desirable to utilize ambient humidity to cure the moisture-curable compounds of this disclosure and generate siloxane-based polymers. In other embodiments, it may be desirable to add measured amounts of water to cure the moisture-curable compounds of this disclosure and generate siloxane-based polymers.

The polymers may be generated as free standing films, or as layers or coatings on substrates. The methods used to produce the polymers will vary depending upon the nature and desired use of the formed polymer.

Generally the polymers are prepared by preparing a reactive mixture containing the moisture-curable siloxane compound, coating the reactive mixture onto a substrate and permitting the mixture to moisture cure and form the polymer. The reactive mixture may comprise the moisture-curable siloxane compound, or it may contain molecules which upon reaction form the moisture-curable siloxane compound. When the reactive mixture comprises the moisture-curable siloxane compound, it may also include a variety of additives. The additives may include reactive additives or non-reactive additives, reactive in this sense meaning that the additive contains moisture-curable or silanol-reactive groups. Examples of reactive additives include, for example, curing agents and catalysts such as water and the catalysts described below, crosslinking agents, and the like. Examples of non-reactive additives include, for example, solvents or a variety of property modifying agents such as tackifying agents, plasticizing agents, fillers or reinforcing agents, and the like.

When the reactive mixture contains molecules that upon reaction form the moisture-curable siloxane compound, the reactive mixture includes oxamido ester terminated siloxanes as described by Formula II, and amines containing a moisture-curable group as described by Formula V. Additionally, other amine-functional molecules may be included, such as diamines that can function as chain extension agents, monoamines that can function as chain termination agents, and triamines or other greater than difunctional amines that can function as branching agents. Like the above described reactive mixtures containing pre-formed moisture-curable siloxane compounds, reactive mixtures containing oxamide molecules can also contain a variety of additives. The additives may be added to the reactive mixture when the reactive mixture is formed, or the additives may be added later, allowing time for the moisture-curing siloxane compound to form in the reactive mixture. In particular, if reactive additives are added, reactive in this sense meaning that the additive contains moisture-curable or silanol-reactive groups, it may be desirable to not add them immediately to the reactive mixture such that the moisture curing reaction does not compete with the reaction to form the moisture-curable siloxane.

As described above, reactive mixtures used to prepare moisture cured polymers may contain a variety of reactive additives. These reactive additives include water, curing catalysts, crosslinking agents, and other silanol-reactive or moisture-curable compounds. As discussed above, measured amounts of water may be added to the reactive mixture to effect the moisture curing reaction, but typically ambient moisture is sufficient to achieve the desired curing without the addition of additional water.

It may be desirable to add a moisture cure catalyst to facilitate the moisture curing reaction. Examples of suitable catalysts include acids, anhydrides, tertiary amines, and organometallic compounds. Examples of acids include, for example organic acids trichloroacetic acid. Examples of anhydrides include, for example, trichloroacetic anhydride. Examples of organometallic compounds include, for example, aluminum-based, bismuth-based, tin-based, vanadium-based, zinc-based, or zirconium-based catalysts. Tin-based catalysts are particularly useful. Most desirable are dibutyl tin compounds, such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. In particular, the dibutyltin dilaurate catalyst DABCO T-12, commercially available from Air Products and Chemicals, Inc., Allentown, Pa. is particularly suitable. The catalyst is generally included at levels of at least 1,000 ppm or greater.

It may desirable to add crosslinking agents or other silanol-reactive or moisture-curable compounds to the reactive mixture. Examples of suitable crosslinking agents include, for example, compounds with multiple silanol-reactive groups such as tetraalkoxy silanes. An example of a commercially available tetraalkoxy silane is tetraethoxy silane (TEOS). Examples of other silanol-reactive or moisture-curable compounds include, for example particles such as nanoparticles that contain silanol, alkoxy silane, or hydroxyl surface groups. These particles include silica particles as well as particles that have been coated with silica, silanols or alkoxy silanes and particles with, for example Al—OH surface groups. Generally, if used, crosslinking agents or other silanol-reactive or moisture-curable compounds are used in fairly low concentrations such as 1-5 weight %. Additionally, the moisture-curable groups can co-react with, for example, Si—OH, Al—OH or other metal oxides or hydroxide surface groups to form strong bonds between the surface and the formed moisture cured polymer. Examples of suitable surfaces, besides the silica particles described above, include surfaces of glass, quartz, mica, talc and inorganic oxide surfaces such as aluminum, copper or iron oxides.

In addition to the reactive compounds present in the reactive mixture, a variety of non-reactive additives may also be present. Examples of non-reactive additives include, for example, solvents or a variety of property modifying agents such as tackifying agents, plasticizing agents, fillers or reinforcing agents, colorants, and performance additives such as, for example, antistatic agents. The term solvents, as used herein, refers to transient liquid media which are present in the reactive mixture but are not reactive with the reactive ingredients and generally are not present, or are not intended to be present, in the final cured polymer. Solvents may be present to aid in the mixing of the reactive and/or non-reactive components, to help to dissipate the heat of reaction, to facilitate the processing of the reactive mixture (such as to provide a coatable viscosity) or for a combination of these reasons. Examples of suitable solvents include: ethers such as diethyl ether, tetrahydrofuran, and tert-butyl methyl ether; ketones such as acetone and methyl ethyl ketone; hydrocarbons such as hexane, heptane, benzene and toluene; esters such as ethyl acetate; and halocarbons such as dichloromethane, and carbon tetrachloride; and mixtures thereof.

In some embodiments, the formed polymer is a free standing film. Such free standing films can be prepared by preparing a reactive mixture and coating or casting the reaction mixture onto a release substrate. A variety of release substrates are suitable, including, for example, release liners and substrates with a release surface. Examples of substrates with a release surface include, for example, trays prepared from low surface energy polymers like polytetrafluoroethylene (TEFLON) or polyolefins like polyethylene or polypropylene or with low surface energy coatings upon them. The reaction mixture may be 100% solids or it may be a solution. Typically if solvents are used, the preparation of the coatings or castings may include a drying step that can utilize elevated temperatures (such as by the use of a drying oven) or reduced pressures (such as by the use of a vacuum oven or autoclave) or a combination thereof. In some embodiments the reaction mixture comprises the moisture-curable siloxane compound and a catalyst. The catalyst may comprise an organometallic catalyst such as dibutyltin dilaurate. While water can be added to accelerate the curing reaction, in many embodiments, ambient water is used to cure the moisture-curable siloxane compound. Depending upon the ambient atmospheric moisture content, the curing may be permitted to occur over relatively long periods of time, such as days, or relatively short periods of time, such as hours. The use of ambient conditions that are controlled and reproducible, such as a constant temperature and humidity controlled room or chamber can be desirable for ensuring consistent curing.

In other embodiments, the reaction mixture is cast or coated onto a substrate and permitted to cure on the substrate. This process is often described as a "cast and cure" process. A variety of substrates can be coated with the reaction mixture, including both flexible (such as films) and non-flexible substrates (such as glass or metal plates, surfaces of articles and the like). In some embodiments, the cast and cure process may be desirable for a variety of reasons. In some instances it may be desirable to form a very thin layer of moisture cured polymer and it may be impractical or even impossible to prepare such thin coatings as free standing films. Additionally, casting and curing on a substrate can provide excellent anchorage of the coating to the substrate without needing any additional layers, such as adhesive layers, interposed between the coating and the substrate surface. Because the moisture curing reaction typically can occur at room temperature without requiring additional input of heat or radiation, it may be possible to cast and cure coatings onto thermally sensitive or fragile substrates without causing damage to the substrates.

The polymers formed by moisture curing of the moisture-curable compound of Formula I can be used to form a variety of different articles. In some embodiments the moisture cured polymer is a coating or layer on a substrate or film and provides a low surface energy layer. Examples of articles that utilize a low surface energy layer of cured siloxane polymer include releasing substrates such as release liners and low adhesion backsizes (LABs).

Release liners may be prepared using the moisture-cured polymers of the present disclosure by coating and curing mixtures containing the moisture-curable compounds of this disclosure on a substrate such as a film or paper. Release liners are articles containing at least one release surface. A release surface is defined as one that has a lack of adhesion, which provides an easy release from substrates, in particular adhesive coated substrates. When applied to an adhesive coated surface, release liners adhere only lightly and are easily removed. A wide range of release liners are known, many of which are multi-layer articles with a carrier layer (which may be, for example, paper, polymeric film, etc) and a release coating on the carrier layer. Generally release liners are used in constructions to provide temporary protection of an adhesive coated surface to prevent premature adhesion and/or contamination of the adhesive surface.

In some embodiments, the release liner may optionally be structured, and the structure on the release liner can be used to create an inverse of the structure on an adhesive, resulting in a structured adhesive. For example, for every groove in the adhesive, the release liner has a corresponding ridge. The ridges would protrude from a liner reference plane, which is defined by the liner surface at the base of each ridge. The dimensions of each ridge correspond to the desired dimensions of each groove in the adhesive. For example, the groove width at the reference plane corresponds to the ridge width at the liner reference plane. In embodiments comprising a protrusion from the reference plane or from the real walls on the adhesive structured surface, the release liner will comprise a corresponding depression. The structure on the release liner can be created in a number of known ways, including embossing the liner to form a structured surface or printing a structure on the surface.

Besides use as release liners, the moisture curable compounds of this disclosure can also be used to prepare releasing layers for adhesive-coated articles such as tapes. Tapes typically contain a backing with an adhesive coated on one side and a release coating on the opposite side. Thus when the tape is rolled up the adhesive contacts the release coating permitting the tape to be unrolled again when used. The release coatings on tapes are sometimes called "low adhesion backsizes" or "LABs". The moisture-cured polymers of this disclosure may function as LABs.

To prepare a tape, a mixture comprising the moisture-curable compounds of this disclosure can be coated onto a tape backing and cured to form the LAB coating. The tape backing can then be coated on the side opposite to the LAB coating with an adhesive coating. This coating may be applied with solvent-borne (either in solvent or water) or solventless (such as, for example, hot melt coating). Such techniques are commonly used in the preparation of tapes.

The adhesive may be any suitable adhesive, but typically will be a pressure sensitive adhesive. Examples of suitable pressure sensitive adhesives include, for example: acrylate- and methacrylate-based pressure sensitive adhesives; natural rubber-based pressure sensitive adhesives; synthetic rubber-based pressure sensitive adhesives; olefin-based pressure sensitive adhesives; block copolymer-based pressure sensitive adhesives such as styrene-isoprene block copolymers for example; vinyl ether-based pressure sensitive adhesives; and polyurethane- or polyurea-based pressure sensitive adhesives. Mixtures of these pressure sensitive adhesives may also be used in some embodiments. Generally the adhesive is chosen based upon the desired use of the tape, as well as other factors such as cost, ease of handling and release performance of the adhesive with the LAB coating.

Another example of an article that may contain a layer of cured siloxane polymer include cutting implements. The low surface energy coating prevents materials to be cut from sticking to the cutting implement. Examples of cutting implements include scissors, shears, knives, blades, saws and the like. The coating can be attached to the cutting implement either by preparing a free standing film of the moisture cured siloxane-containing polymer and adhering the film to the blade or by coating and curing a reaction mixture containing the moisture-curable compound of Formula I and other optional components onto the blade and permitting the polymer to cure in place (a cast and cure process). In some embodiments, the cast and cure process may be particularly suitable to generate very thin coatings and to facilitate anchorage of the cured siloxane-containing polymer layer to the blade.

The moisture cured siloxane-containing polymer can be used to prepare siloxane-based adhesives such as a heat activated adhesives or a pressure sensitive adhesives by the addition of one or more tackifying resins, such as a silicone tackifying resin, to the moisture cured siloxane-containing polymer. Suitable silicone tackifying resins include MQ tackifying resins. The MQ tackifying resin and the moisture cured siloxane-containing polymer generally are present in the form of a blend of MQ tackifying resin and silicone polymer. Typically the siloxane polymer is present in the siloxane-based pressure sensitive adhesive composition in an amount of from about 30% by weight to about 90% by weight, 30% by weight to 85% by weight, 30% by weight to 70% by weight, or even 45% by weight to 55% by weight. The MQ tackifying resin, if present, is typically present in an amount of at least 10% by weight. In some embodiments, the MQ tackifying resin is present in the siloxane-based pressure sensitive adhesive composition in an amount of from about 15% by weight to about 70% by weight, from about 30% by weight to about 70% by weight, or from about 40% by weight to about 60% by weight, or even 45% by weight to 55% by weight.

Useful MQ tackifying resins include, e.g., MQ silicone resins, MQD silicone resins, and MQT silicone resins, which also may be referred to as copolymeric silicone resins and which typically have a number average molecular weight of about 100 to about 50,000, or about 500 to about 20,000 and generally have methyl substituents. The MQ silicone resins include both non-functional and functional resins, the functional resins having one or more functionalities including, for example, silicon-bonded hydrogen, silicon-bonded alkenyl, and silanol.

MQ silicone resins are copolymeric silicone resins having $R'_3SiO_{1/2}$ units (M units) and $SiO_{4/2}$ units (Q units). Such resins are described in, for example, Encyclopedia of Polymer Science and Engineering, vol. 15, John Wiley & Sons, New York, (1989), pp. 265 to 270, and U.S. Pat. Nos. 2,676, 182; 3,627,851; 3,772,247; and 5,248,739. MQ silicone resins having functional groups are described in U.S. Pat. No. 4,774,310, which describes silyl hydride groups, U.S. Pat. No. 5,262,558, which describes vinyl and trifluoropropyl groups, and U.S. Pat. No. 4,707,531, which describes silyl hydride and vinyl groups. The above-described resins are generally prepared in solvent. Dried or solventless MQ silicone resins are prepared as described in U.S. Pat. Nos. 5,319, 040; 5,302,685; and 4,935,484.

MQD silicone resins are terpolymers having $R'_3 SiO_{1/2}$ units (M units), $SiO_{4/2}$ units (Q units), and $R'_2SiO_{2/2}$ units (D units) as described, e.g., in U.S. Pat. No. 5,110,890 and Japanese Kokai HEI 2-36234.

MQT silicone resins are terpolymers having $R_3SiO_{1/2}$ units (M units), $SiO_{4/2}$ units (Q units), and $RSiO_{3/2}$ units (T units) (MQT resins).

Commercially available MQ resins include SR-545 MΩ resin in toluene available from General Electric Co., Silicone Resins Division (Waterford, N.Y.), MQOH resins which are MQ silicone resins in toluene available from PCR, Inc. (Gainesville, Fla.). Such resins are generally supplied in organic solvent. These organic solutions of MQ silicone resin may be used as is or may be dried by any number of techniques known in the art including, e.g., spray drying, oven drying, and steam separation, to provide a MQ silicone resin at 100 percent non-volatile content. The MQ silicone resin can also include blends of two or more silicone resins. Some MQ silicone resins may be obtained commercially as dry powders such as, for example, WACKER-BELSIL TMS-803 from Wacker Chemie.

The siloxane-based pressure sensitive adhesive compositions may be prepared by a variety of processes. Typically the compositions are prepared by adding the MQ silicone resin before the moisture cured siloxane polymer is formed. In some embodiments, a moisture-curable composition is prepared comprising the moisture-curable siloxane compound as described above. To this curable composition is added the MQ silicone resin and the mixture is then coated and cured. The moisture-curable siloxane compound and the MQ silicone resin can be mixed utilizing a variety of mixing techniques, including both solvent-based and solventless processes. Typically, the moisture-curable siloxane compound and the MQ silicone resin are mixed in solventless processes. In some embodiments, the moisture-curable siloxane compound and the MQ silicone resin are mixed using melt blending devices.

After mixing, the moisture-curable siloxane compound and the MQ silicone resin mixture can be coated on a substrate. Suitable coating techniques include techniques such as, for example, die coating, knife coating, roll coating, gravure coating, rod coating, curtain coating, air knife coating and printing techniques such as screen printing or inkjet printing. The substrate may be a release liner, a rigid surface, a tape backing, a film, or a sheet. The tape backing can include single layer or multi-layer constructions. Useful backings include, for example, metal foils, polymeric films, including porous films, papers, polymeric foams, non-woven backings, cloth backings, and the like. Representative examples of potentially useful polymeric backing materials include polyolefins, e.g., polyethylene, including high density polyethylene, low density polyethylene, linear low density polyethylene, and linear ultra low density polyethylene, polypropylene and polybutylenes; vinyl copolymers, e.g., polyvinyl chlorides, both plasticized and unplasticized, and polyvinyl acetates; olefin copolymers, e.g., ethylene/methacrylate copolymers, ethylene/vinylacetate copolymers, acrylonitrile-butadiene-styrene copolymers, and ethylene/propylene copolymers; acrylic polymers and copolymer; and combinations thereof.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| MCA-1 | Moisture-curable amine-1, commercially available from Momentive Performance Materials, Albany NY as SILQUEST A-1100, with the |

-continued

Table of Abbreviations

| Abbreviation or Trade Designation | Description |
|---|---|
| | formula: $H_2N\diagdown\diagup\diagdown\diagup Si(OCH_2CH_3)_3$. |
| MCA-2 | Moisture-curable amine-2, commercially available from Momentive Performance Materials, Albany NY as SILQUEST A-1110, with the |
| | formula: $H_2N\diagdown\diagup\diagdown\diagup Si(OCH_3)_3$. |
| MCA-3 | Moisture-curable amine-3, commercially available from Momentive Performance Materials, Albany NY as SILQUEST A-LINK 15, with |
| | the formula: $HN\diagdown\diagup\diagdown\diagup Si(OCH_3)_3$. |
| MCA-4 | Moisture-curable amine-4, commercially available from Momentive Performance Materials, Albany NY as SILQUEST A-2120, with the |
| | formula: $H_2N\diagdown\diagup\underset{H}{N}\diagdown\diagup\diagdown Si(OCH_3)_2$. |
| MCA-5 | Moisture-curable amine-5, commercially available from Momentive Performance Materials, Albany NY as SILQUEST Y-9669, with the |
| | formula: 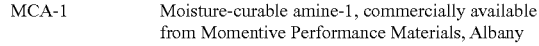 |
| DBTDL | dibutyltindilaurate |
| MQ resin-1 | MQ silicone resin commercially available from Dow Corning Midland, MI as Dow Corning 2-7066 a 62.6% solids mixture in xylene. |
| EDA | Ethylenediamine |
| XDA | m-xylylenediamine |
| THF | Tetrahydrofuran |
| PDMS diamine | A polydimethylsiloxane diamine with a number average molecular weight of about 1,000 g/mole (1K), 5,000 g/mole (5K), about 14,000 g/mole (14K), or about 25,000 g/mole (25K) prepared according to U.S. Pat. No. 5,214,119. |
| CTH Room | Constant Temperature and Humidity Room set to 25° C. and 50% Relative Humidity (RH) |
| Backing-1 | Polyester film commercially available as Mitsubishi Hostaphan 3SAB |
| TEOS | Tetraethoxy silane |
| HCF-1 | Hydrocarbon Fluid-1, commercially available as Isopar-L Fluid, from Exxon Mobil Chemical Company, Houston TX. |
| SNP-1 | Silica Nanoparticle-1, commercially available as IPA-ST-MS (Colloidal silica in isopropanol composition, with 20 nanometer diameter silica particles) from Nissan Chemical Industries, Houston, TX. |

Test Methods
180° Peel Adhesion

This peel adhesion test is similar to the test method described in ASTM D 3330-90, substituting a glass substrate for the stainless steel substrate described in the test (for the present purpose, also referred to as "glass substrate peel adhesion test").

Sample testing was carried out in a CTH room. Adhesive coatings on polyester film were cut into 1.27 centimeter by 15 centimeter (0.5 inch by 6 inch) strips. Each strip was then adhered to a 10 centimeter by 20 centimeter clean, solvent washed glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a five second data collection time. Two samples were tested; the reported peel adhesion value is an average of the peel adhesion value from each of the two samples.

Shear Strength

This shear strength test is similar to the test method described in ASTM D 3654-88.

Room temperature (25° C.) sample testing was carried out in a CTH room, 70° C. sample testing was carried out in a 70° C. oven. Adhesive coatings film were cut into 1.27 centimeter (0.5 inch) by 15 centimeter (6 inch) strips. Each strip was then adhered to a stainless steel panel such that a 1.27 centimeter by 1.27 centimeter (0.5 inch by 0.5 inch) portion of each strip was in firm contact with the panel and one end portion of the tape being free. The panel with coated strip attached was held in a rack such that the panel formed an angle of 178° with the extended tape free end which was tensioned by application of a force of one kilogram applied as a hanging weight from the free end of the coated strip. The 2° less than 180° was used to negate any peel forces, thus ensuring that only shear strength forces were measured, in an attempt to more accurately determine the holding power of the tape being tested. The time elapsed for each tape example to separate from the test panel was recorded as the shear strength. All shear strength failures (if the adhesive failed at less than 10,000 minutes) reported herein were cohesive failures of the adhesive. Each test was terminated at 10,000 minutes, unless the adhesive failed at an earlier time (as noted). Tests were run either at room temperature or 70° C.

Titration Method to Determine Amine Equivalent Weight (AEW) of PDMS Diamines

The amine equivalent weight (AEW) of PDMS diamines was determined by dissolving the PDMS diamine in THF and titrating using standardized 1 Normal HCL against a bromophenol blue endpoint.

Tape Snap Removal Test

Scissors blades with coatings of moisture-cured formulations of this disclosure were tested for the ability of tape samples to be removed from the coating using the "tape snap removal" test. The tape snap removal test was performed by applying and "snapping off" (quickly removing) 3M 165 SCOTCH Mailing and Storage Tape (the tape has an aggressive acrylic pressure sensitive adhesive) ten times from the coated surface. Samples of 3M SCOTCH Crafting Tape Runner 007A (the transfer tape has a rubber based pressure sensitive transfer adhesive) were applied to the surface and rubbed off with the surface with a finger. The ability to rub off the 3M SCOTCH Crafting Tape Runner 007A after tape snapping was evaluate using the scale shown in Table A below.

TABLE A

| Coating Evaluation Rating | Description of Rating |
| --- | --- |
| 1 | Very easy to remove 007A tape |
| 2 | Easy to remove 007A tape |
| 3 | Less easy to remove 007A tape |
| 4 | Difficult to remove 007A tape |
| 5 | Very difficult to remove 007A tape |

PREPARATIVE EXAMPLES

Preparative Example A

Preparation of 5,000 MW Oxamido Ester Terminated Siloxane

Diethyl oxalate (250 grams) was placed in a 3 liter, 2-part resin flask equipped with a mechanical stirrer, heating mantle, nitrogen inlet tube (with stopcock), and an outlet tube. 5K PDMS diamine (2,000.00 grams) was added slowly with stirring. The flask was purged with nitrogen for 15 minutes. The contents were stirred and heated to 150° C. under vacuum (133 Pascals, 1 Torr) for 4 hours, until no further distillate was able to be collected. The remaining liquid was cooled to room temperature to provide an oxamido ester terminated siloxane compound of Formula II. Gas chromatographic analysis of the clear, mobile liquid showed that no detectable level of diethyl oxalate remained. Equivalent weight was determined by back titration with ethanolamine to be 2,550 grams/equivalent.

Preparative Example B

Preparation of 25,000 MW Oxamido Ester Terminated Siloxane

Diethyl oxalate (398.60 grams) was placed in a 12 liter, 3-neck resin flask equipped with a mechanical stirrer, heating mantle, argon inlet tube (with stopcock), and an outlet tube. The flask was purged with argon for 15 minutes and 25K PDMS diamine (6818.70 grams, molecular weight approximately equal to 25,000 g/mole) was added slowly with stirring. The reaction flask was fitted with a distillation adaptor and receiver. The contents were stirred and heated to 165° C. under vacuum (133 Pascals, 1 Torr) for 4 hours, until no further distillate was able to be collected. The remaining liquid was cooled to room temperature to provide an oxamido ester terminated siloxane compound of Formula H. Equivalent weight was determined by back titration with ethanolamine to be 12,498 grams/equivalent.

Preparative Example C

Preparation of 1,000 MW Oxamido Ester Terminated Siloxane

Diethyl oxalate (326.00 grams) was placed in a 2 liter, 3-neck resin flask equipped with a mechanical stirrer, heating mantle, nitrogen inlet tube (with stopcock), and an outlet tube. 1K PDMS diamine (497.50 grams, molecular weight approximately equal to 1,000 g/mole) was added slowly with stirring. The reaction mixture was mixed for one hour at ambient temp. followed by 75 min at 80° C. at which point no amine was detected by titration. The reaction flask was fitted with a distillation adaptor and receiver. The contents were stirred and heated to 120° C. under vacuum (133 Pascals, 1 Ton) for 2 hours, until no further distillate was able to be collected. The remaining liquid was cooled to room temperature to provide an oxamido ester terminated siloxane compound of Formula II. Equivalent weight was determined by back titration with ethanolamine to be 910 grams/equivalent.

Preparative Example D

Preparation of Oxalate-Capped Amino Silane

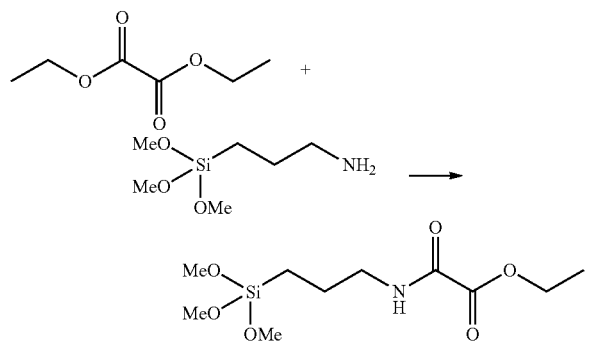

In a glass vial, 48.91 grams (0.669 eq.) of diethyl oxalate was cooled to in an ice/water bath. While vigorously stirring the diethyl oxalate, 30.00 grams (0.167 eq.) of MCA-2 was added drop-wise to the vial. With continuous stirring, the reaction mixture was allowed to slowly warm to room temperature as the ice melted. The reaction mixture was transferred to a 3-neck flask and the ethanol byproduct and excess diethyl oxalate were distilled out from between 25-120° C. under high vacuum.

Preparative Example E

Preparation of EDA-Capped 25,000 MW Oxamido Ester Terminated Siloxane

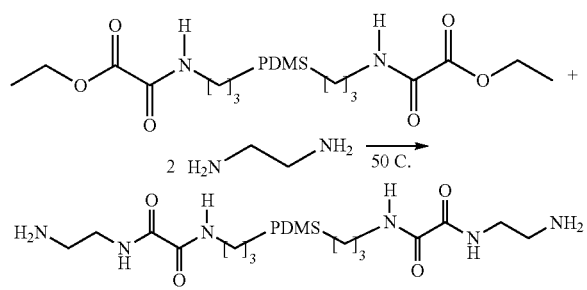

In a 1 liter 3-necked flask, 9.04 grams (0.301 eq.) of EDA and 50 grams of xylenes were stirred under a nitrogen blanket and heated to 50° C. To this vigorously stirred mixture was added 400.00 grams (0.0301 eq.) of the oxamido ester terminated siloxane prepared in Preparative Example B over 165 minutes and the resulting reaction mixture was stirred for 2 hours at 50° C. The flask was set up for distillation and the ethanol, excess EDA and xylenes were distilled out from between 50-120° C. The product (372.82 grams) was isolated and the amine equivalent weight was found to be 19,353 g/mole by titration.

EXAMPLES

Example 1

A moisture-curable oxamido siloxane was prepared. In a glass jar, 100.05 grams ($8.005 \times 10^{-3}$ eq.) of the oxamido ester terminated siloxane prepared in Preparative Example B and 1.7716 grams ($8.005 \times 10^{-3}$ eq.) of MCA-1 were combined and mixed overnight on a roller. The reaction mixture was heated for 6 hours at 60° C. followed by overnight mixing at ambient temperature. No unreacted amine was detected by titration.

Example 2

A moisture-cured polymer was prepared. In a jar, 20.00 grams of the oxamido triethoxysilane terminated siloxane prepared in Example 1 was combined with 0.04 gram of DBTDL and mixed until homogeneous. This mixture was cast in a TEFLON tray and allowed to cure under ambient lab conditions for one week. The product was a clear and colorless elastomer.

Example 3

A moisture-curable oxamido siloxane was prepared. In a glass jar, 101.23 grams ($8.100 \times 10^{-3}$ eq.) of the oxamido ester terminated siloxane prepared in Preparative Example B and 1.4524 grams ($8.100 \times 10^{-3}$ eq.) of MCA-2 were combined and mixed overnight on a roller. The reaction mixture was heated for 6 hours at 60° C. followed by overnight mixing at ambient temperature. No unreacted amine was detected by titration.

Example 4

A moisture-cured polymer was prepared. In a jar, 20.00 grams of the oxamido trimethoxysilane terminated siloxane prepared in Example 3 was combined with 0.04 gram of DBTDL and mixed until homogeneous. This mixture was cast in a TEFLON tray and allowed to cure under ambient lab conditions for one week. The product was a clear and colorless elastomer.

Example 5

A moisture-curable oxamido siloxane and a moisture-cured polymer were prepared. In a glass jar, 50.00 grams ($1.9608 \times 10^{-2}$ eq.) of the oxamido ester terminated siloxane prepared in Preparative Example A and 3.52 grams ($1.9632 \times 10^{-2}$ eq.) of MCA-2 were combined and mixed overnight on a roller. To this mixture, 0.10 gram of DBTDL was added and mixed until homogeneous. The resulting mixture was cast in a TEFLON tray and placed in a CTH Room overnight. The product was a clear and colorless elastomer.

Example 6

A moisture-curable oxamido siloxane and a moisture-cured polymer were prepared. In a glass jar, 20.00 grams ($2.1978 \times 10^{-2}$ eq.) of the oxamido ester terminated siloxane prepared in Preparative Example C and 3.95 grams ($2.2030 \times 10^{-2}$ eq.) of MCA-2 were combined and mixed overnight on a roller. To this mixture 0.04 gram of DBTDL was added and mixed until homogeneous. The resulting mixture was cast in a TEFLON tray and placed in a CTH Room overnight. The product was a clear and colorless elastomer.

Example 7

A moisture-curable oxamido siloxane and a moisture-cured polymer were prepared. In a glass jar, 20.00 grams ($7.843 \times 10^{-3}$ eq.) of the oxamido ester terminated siloxane prepared in Preparative Example A, 0.0357 gram (1.176× $10^{-3}$ eq.) of EDA and 1.1953 grams (6.666×$10^{-3}$ eq.) of MCA-2 were combined and mixed overnight on a roller. The resulting waxy mixture was dissolved in 15.25 grams of THF, and 0.04 gram of DBTDL was added and the mixture was mixed until homogeneous. The resulting mixture was cast in a TEFLON tray. The solvent was allowed to evaporate in a fume hood and the tray was placed in a CTH Room overnight. The product was a clear and colorless elastomer.

Example 8

A moisture-curable oxamido siloxane and a moisture-cured polymer were prepared. In a glass jar, 20.00 grams (7.843×$10^{-3}$ eq.) of the oxamido ester terminated siloxane prepared in Preparative Example A was dissolved in 15.25 grams of THF, and 0.8174 gram (7.843×$10^{-3}$ eq.) of MCA-4 was added and the mixture was mixed overnight on a roller. To this mixture, 0.04 gram of DBTDL was added and mixed until homogeneous. The resulting mixture was cast in a TEFLON tray. The solvent was allowed to evaporate in a fume hood and the tray was placed in a CTH Room overnight. The product was a clear and colorless elastomer.

Example 9

A moisture-curable oxamido siloxane and a moisture-cured polymer were prepared. In a glass jar, 20.00 grams (7.843×$10^{-3}$ eq.) of the oxamido ester terminated siloxane prepared in Preparative Example A, 0.0809 gram (1.176× $10^{-3}$ eq.) of XDA and 1.4800 grams (6.667×$10^{-3}$ eq.) of MCA-3 were combined and mixed overnight on a roller. The resulting waxy mixture was dissolved in 15.25 grams of THF, and 0.04 gram of DBTDL was added and the mixture was mixed until homogeneous. The resulting mixture was cast in a TEFLON tray. The solvent was allowed to evaporate in a fume hood and the tray was placed in a CTH Room overnight. The product was a clear and colorless elastomer.

Example 10

A moisture-curable oxamido siloxane and a moisture-cured polymer were prepared. In a glass jar, 20.00 grams (7.843×$10^{-3}$ eq.) of the oxamido ester terminated siloxane prepared in Preparative Example A, 0.0809 gram (1.176× $10^{-3}$ eq.) of XDA, and 1.6940 grams (6.667×$10^{-3}$ eq.) of MCA-5 were combined and mixed overnight on a roller. The resulting waxy mixture was dissolved in 15.25 grams of THF, and 0.04 g DBTDL was added and the mixture was mixed until homogeneous. The resulting mixture was cast in a TEFLON tray. The solvent was allowed to evaporate in a fume hood and then the tray was placed in a CTH Room. The product was a clear and colorless grease.

Example 11

A moisture-curable oxamido siloxane was prepared. In a glass jar, 41.80 grams (3.184×$10^{-3}$ eq.) of the oxamido ester terminated siloxane prepared in Preparative Example B, 0.0938 gram (3.121×$10^{-3}$ eq.) of EDA, and 0.0116 gram (6.29×$10^{-5}$ eq.) of MCA-2 were combined and mixed until homogeneous. The reaction mixture was allowed to cure for 6 days at ambient temperature. The formed moisture-curable oxamido siloxane was dissolved in THF and cast in a TEFLON tray. The solvent was allowed to evaporate in a fume hood.

Example 12

A pressure sensitive adhesive was prepared. In a glass jar, 6.00 grams of the moisture-curable oxamido siloxane prepared in Example 11, 9.60 grams of MQ resin-1, and 44.00 grams of toluene were combined and mixed until homogeneous. To this mixture, 0.0070 gram of DBTDL was added and the mixture was mixed until homogeneous. The resulting solution was knife coated onto Backing-1 at a gap sufficient to give a dry thickness of about 38 micrometers (1.5 mils). Coatings were dried for one hour at 70° C. followed by overnight (minimum) conditioning in a CTH Room. 180° Peel Adhesion and Shear Strength testing at room temperature and 70° C. were done using the Test Methods described above. The data are shown in Table 1.

Comparative Example C1

A pressure sensitive adhesive was prepared. In a glass jar, 318.15 grams of the oxamido ester terminated siloxane prepared in Preparative Example B, 508.70 grams of MQ resin-1, and 1,622.40 grams of toluene were combined and mixed until homogeneous. The resulting solution was knife coated onto Backing-1 at a gap sufficient to give a dry thickness of about 38 micrometers (1.5 mils). Coatings were dried for one hour at 70° C. followed by overnight (minimum) conditioning in a CTH Room. 180° Peel Adhesion and Shear Strength testing at room temperature and 70° C. were done using the Test Methods described above. The data are shown in Table 1.

TABLE 1

| Example | % MCA | 180° C. Peel Adhesion (N/dm) | 25° C. Shear Strength (minutes) | 70° C. Shear Strength (minutes) |
|---|---|---|---|---|
| C1 | 0 | 74.8 | >10,000 | 76 |
| 12 | 2 | 79.6 | >10,000 | 410 |

Example 13

A series of highly crosslinked moisture-cured polymers were formed. In glass bottles, mixtures containing the moisture-curable oxamido siloxane prepared in Example 1, HCF-1, 1 Normal HCl, and either TEOS or SNP-1 as shown in Table 2 were prepared and mixed overnight on a roller. The resulting turbid reaction mixtures were filtered using a Whatman 4 filter paper and clear solutions obtained. The resulting compositions were diluted to 5 weight % and spray coated onto fabric samples and permitted to cure overnight at room temperature.

TABLE 2

| Example | Moisture-curable Oxamido Siloxane (grams) | HCF-1 (grams) | 1 Normal HCl (grams) | TEOS (grams) | SNP-1 (grams) |
|---|---|---|---|---|---|
| 13A | 10 | 30 | 1 | 60 | 0 |
| 13B | 5 | 35 | 1 | 60 | 0 |
| 13C | 20 | 30 | 1 | 50 | 0 |
| 13D | 10 | 30 | 1 | 0 | 60 |
| 13E | 20 | 30 | 1 | 0 | 50 |

Example 14

A moisture-curable oxamido siloxane was prepared. In a glass jar, 50.85 grams (2.63×$10^{-3}$ eq.) of the compound prepared in Preparative Example E and 20 grams of toluene were combined and mixed overnight on a roller. To this mixture, 0.7341 gram ($2.63 \times 10^{-3}$ eq.) of the compound prepared in Preparative Example D was added and the mixture mixed until homogeneous. The reaction mixture was allowed to cure for 5 days at ambient temp.

Example 15

A moisture-cured polymer was prepared. In a glass jar, 20.00 grams of the compound prepared in Example 14 was combined with 60 grams of THF and one drop of DBTDL and the mixture was mixed until homogeneous. This mixture was cast into a TEFLON tray and allowed to cure under ambient lab conditions for one week. The product was a clear and colorless elastomer.

Examples 16-18 and Comparative Example C2

Coating formulations were prepared using the moisture-curable oxamido siloxane of Example 1 at three different concentrations in toluene shown in Table 3. For Comparative Example C2 no coating formulation was used. Stainless steel scissors blades coated with TiAlN by physical vapor deposition were rinsed with acetone and permitted to air dry in a forced air fume hood. The coating formulations were coated on the scissors blades. For Example 16, the coating formulation was sprayed on the blades with a pipette three times, permitted to air dry at room temperature for 5 minutes in a forced air fume hood, placed in a 140° C. oven for 60 minutes, and allowed to cool. For Examples 17 and 18, the blades were dipped into a tank containing the coating formulation, allowed to sit in the tank for 5 minutes, removed from the tank, permitted to air dry at room temperature for 5 minutes in a forced air fume hood, placed in a 140° C. oven for 60 minutes, and allowed to cool. The coated scissors blades were tested using the Tape Snap Removal Test Method described above. The results are shown in Table 3. Additional testing was carried out with the scissors sample of Example 17. The scissors were used to cut standard Staples copy paper 10,000 times and the ability to rub off the 3M SCOTCH Crafting Tape Runner 007A was again tested. The coating had a "2" rating according to the scale in Table A. The scissors were then used to cut an 2,032 centimeter (800 inch) length rolled out sheet of 3M 165 SCOTCH Mailing and Storage Tape lengthwise down the middle with no adhesive build-up observed on the scissors blades.

TABLE 3

| Example | Coating Formulation Example Number | Coating Formulation Concentration in Toluene (% by weight) | Tape Snap Removal Test Rating |
|---|---|---|---|
| 16 | 1 | 10 | 1 |
| 17 | 1 | 3 | 1 |
| 18 | 1 | 1 | 1 |
| C2 | — | — | 5 |

What is claimed is:

1. A reactive compound comprising the formula:

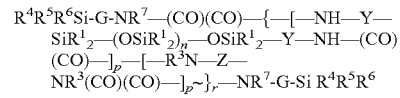

wherein each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is an alkylene or aralkylene group with from 1-10 carbon atoms;

Z is an alkylene, aralkylene or heteroalkylene group;

each $R^3$ is hydrogen or alkyl or $R^3$ taken together with Z and with the nitrogen to which they are both attached forms a heterocyclic group;

$R^4$, $R^5$, and $R^6$, are each independently an alkyl, aryl or alkoxy group with the proviso that at least one of $R^4$, $R^5$, and $R^6$ is an alkoxy group;

each $R^7$ is independently a hydrogen, alkyl, aryl group or heteroalkyl group;

n is independently an integer of 0 to 1500;

p is an integer of 1 or greater;

q is an integer of 0 or greater; and r is an integer of 1 or greater.

2. The reactive compound of claim 1, wherein each $R^1$ is methyl.

3. The reactive compound of claim 1, wherein Y is an alkylene having 1 to 4 carbon atoms.

4. The reactive compound of claim 1, wherein n is at least 40.

5. The reactive compound of claim 1, wherein $R^4$, $R^5$, $R^6$ comprise alkoxy groups with 1-6 carbon atoms.

6. A method of making a reactive compound comprising mixing together under reaction conditions:

a compound of the formula:

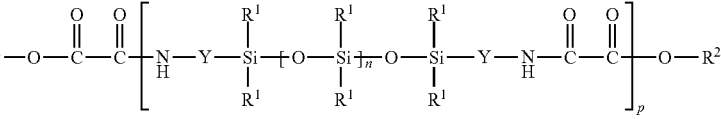

wherein each $R^1$ is independently an alkyl, haloalkyl, aralkyl, alkenyl, aryl, or aryl substituted with an alkyl, alkoxy, or halo;

each $R^2$ is independently an alkyl, haloalkyl, aryl, or aryl substituted with an alkyl, alkoxy, halo, alkoxycarbonyl, or imino of formula $-N=CR^8R^9$ where $R^8$ is hydrogen, alkyl, aralkyl, substituted aralkyl, aryl, or substituted aryl, and $R^9$ is alkyl, aralkyl, substituted aralkyl, aryl, or substituted aryl;

each Y is independently an alkylene, aralkylene, or a combination thereof;

n is independently an integer of 0 to 1500; and p is an integer of 1 or greater; and an amine of formula $R^7HN\text{-}G\text{-}SiR^4R^5R^6$, wherein G is an alkylene or aralkylene group with from 1-10 carbon atoms; and $R^7$ is hydrogen or alkyl or $R^7$ taken together with G and with the nitrogen to which they are both attached forms a heterocyclic group: and $R^4$, $R^5$, and $R^6$, are each independently an alkyl, aryl or alkoxy group with the proviso that at least one of $R^4$, $R^5$, and $R^6$ is an alkoxy group.

7. The method of claim 6, wherein $R^7$ is hydrogen.

8. The method of claim 6, wherein the method further comprises removing a reaction by-product of formula $R^2OH$ from the copolymer.

9. A polymer comprising: the reaction product of a reaction mixture comprising:

a reactive compound with the formula:

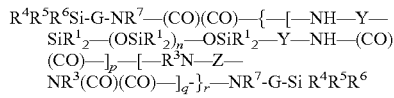

wherein each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is an alkylene or aralkylene group with from 1-10 carbon atoms;

Z is an alkylene, aralkylene or heteroalkylene group;

each $R^3$ is hydrogen or alkyl or $R^3$ taken together with Z and with the nitrogen to which they are both attached forms a heterocyclic group;

$R^4$, $R^5$, and $R^6$, are each independently an alkyl, aryl or alkoxy group with the proviso that at least one of $R^4$, $R^5$, and $R^6$ is an alkoxy group;

each $R^7$ is independently a hydrogen, alkyl, aryl group or heteroalkyl group;

n is independently an integer of 0 to 1500;

p is an integer of 1 or greater;

q is an integer of 0 or greater; and r is an integer of 1 or greater; and water.

10. The polymer of claim 9, wherein the reactive compound comprises n is at least 40.

11. The polymer of claim 9, wherein $R^4$, $R^5$, and $R^6$ comprise alkoxy groups with 1-6 carbon atoms.

12. The polymer of claim 9, further comprising a moisture cure catalyst comprising: an acid, an anhydride, an organo-tin compound, a tertiary amine, or combination thereof.

13. The polymer of claim 9, wherein the polymer comprises a release material.

14. The polymer of claim 9, further comprising a tackifying resin to form a pressure sensitive adhesive.

15. The polymer of claim 9, further comprising a crosslinking agent wherein the crosslinking agent comprises:

a polyfunctional alkoxy silane, a silica nanoparticle, or a nanoparticle comprising multiple hydroxyl groups on the surface.

16. An article comprising:

a substrate; and a polymer layer on the substrate, wherein the polymer comprises the reaction product of a reaction mixture comprising:

a reactive compound with the formula:

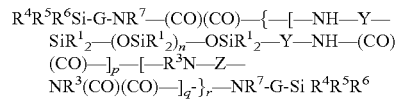

wherein each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

G is an alkylene or aralkylene group with from 1-10 carbon atoms;

Z is an alkylene, aralkylene or heteroalkylene group;

each $R^3$ is hydrogen or alkyl or $R^3$ taken together with Z and with the nitrogen to which they are both attached forms a heterocyclic group;

$R^4$, $R^5$, and $R^6$, are each independently an alkyl, aryl or alkoxy group with the proviso that at least one of $R^4$, $R^5$, and $R^6$ is an alkoxy group;

each $R^7$ is independently a hydrogen, alkyl, aryl group or heteroalkyl group;

n is independently an integer of 0 to 1500;

p is an integer of 1 or greater;

q is an integer of 0 or greater; and r is an integer of 1 or greater; and water.

17. The article of claim 16, wherein the polymer comprises a release material.

18. The article of claim 17, wherein the substrate comprises:

a film, a plate, an optical device, or the surface of a cutting tool with a sharpened blade.

19. The article of claim 18, wherein the cutting tool comprises scissors, a knife, a machine blade, or a saw.

20. The article of claim 16, wherein the polymer layer further comprises a tackifying resin.

\* \* \* \* \*

UNITED STATES PATENT AND TRADEMARK OFFICE
CERTIFICATE OF CORRECTION

| | |
|---|---|
| PATENT NO. | : 8,614,281 B2 |
| APPLICATION NO. | : 13/518542 |
| DATED | : December 24, 2013 |
| INVENTOR(S) | : Richard Hansen et al. |

It is certified that error appears in the above-identified patent and that said Letters Patent is hereby corrected as shown below:

In the Specification

Column 8
Line 18, Delete "greater" and insert -- greater. --, therefor.

Column 9
Line 23, Delete "a an" and insert -- an --, therefor.

Column 22
Line 65, Delete "Ton)" and insert -- Torr) --, therefor.

Signed and Sealed this
Nineteenth Day of May, 2015

Michelle K. Lee
*Director of the United States Patent and Trademark Office*